United States Patent
Wang et al.

(10) Patent No.: US 6,687,051 B1
(45) Date of Patent: Feb. 3, 2004

(54) MICROSCOPIC IMAGE APPARATUS FOR CONVERTING INFRARED LIGHT INTO VISIBLE LIGHT

(75) Inventors: Hau-Wei Wang, Taipei (TW); Yaomin Lin, Hsinchu (TW); Ying-Cheun Spring Yeh, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/294,750

(22) Filed: Nov. 15, 2002

(51) Int. Cl.[7] .................................................. F21V 9/06
(52) U.S. Cl. ...................................................... 359/361
(58) Field of Search ................................. 359/361, 350, 359/808, 811, 819, 820, 827–830, 407, 410, 425; 250/330, 338.1

(56) References Cited

U.S. PATENT DOCUMENTS

| | | | |
|---|---|---|---|
| 3,629,602 A | * | 12/1971 | Firester ........................ 359/330 |
| 5,291,263 A | * | 3/1994 | Kong ........................... 356/4.01 |
| 5,535,230 A | * | 7/1996 | Abe ............................. 372/43 |
| 5,537,261 A | * | 7/1996 | Palmer ........................ 359/819 |
| 6,181,377 B1 | * | 1/2001 | Kobayashi ............. 348/333.02 |
| 6,339,219 B1 | * | 1/2002 | Ishizuya et al. ............ 250/330 |

\* cited by examiner

*Primary Examiner*—Mohammad Sikder
(74) *Attorney, Agent, or Firm*—Birch, Stewart, Kolasch & Birch, LLP

(57) ABSTRACT

A microscopic image apparatus for converting infrared light into visible light. The microscopic image apparatus includes a sample stage, an infrared source, an object lens for converting infrared light into visible light, a visible light source, a dichroic mirror, a visible light imaging lens and a visible light image capturing device. The object lens further includes an optical crystal and an infrared object lens. After the infrared source outputs infrared light to a sample placed on the sample stage, the object lens converts infrared light spectrum image into visible light spectrum image. Then, the visible light spectrum image is obtained by the visible light imaging lens and the visible light image capturing device.

11 Claims, 4 Drawing Sheets

MICROSCOPIC IMAGE APPARATUS FOR CONVERTING INFRARED LIGHT INTO VISIBLE LIGHT

BACKGROUND OF THE INVENTION

1. Field of the Invention

The present invention relates to a microscopic image apparatus, and in particular to a microscopic image apparatus or converting infrared light into visible light.

2. Description of the Related Art

FIG. 1 is a schematic view showing a conventional infrared microscopic image apparatus. The conventional infrared microscopic image apparatus uses the method of step-scan Fourier Transform infrared (FTIR) and includes an infrared object lens 1, an IR Michelson-type scan interferometer module 8, an infrared focal-plane array detector (IR FPA detector) 3, an infrared imaging lens 7 and an infrared source 2. The IR Michelson-type scan interferometer module 8 includes a beam splitter 8a, a stationary mirror 8b and a scan mirror 8c. When the infrared source 2 outputs infrared light to a sample 6 via the IR Michelson-type scan interferometer module 8, the infrared light 5, which is absorbed by sample 6, is detected and received by the infrared object lens 1 and the IR FPA detector 3. Then, the every pixel in the IR FPA detector 3 obtains multi-wavelength interference spectrum. The multi-wavelength interference spectrum is converted into infrared absorption spectrum of the sample by the method of Fourier transform. Nevertheless, the IR Michelson-type scan interferometer module 8 and the IR FPA detector 3 are very expensive. Thus, the infrared microscope is not widely used.

Consequently, the invention provides a low-cost microscopic image apparatus replacing the IR Michelson-type scan interferometer module 8 and the IR FPA detector 3 and obtaining the same infrared microscopic image.

SUMMARY OF THE INVENTION

An object of the invention is to provide a microscopic image apparatus for converting infrared light into visible light. The microscopic image apparatus comprises a sample stage, an infrared source, a dichroic mirror, an object lens for converting infrared light into visible light, a visible light source, a visible light imaging lens and a visible light image capturing device. The sample stage accommodates a sample. The infrared source outputs first infrared light to the sample. The first infrared light passes through the sample to create second infrared light having infrared absorption spectrum information of the sample. The object lens has an optical crystal and an infrared object lens. The infrared object lens receives the second infrared light having infrared absorption spectrum information of the sample and converts the second infrared light into parallel infrared light to enter the optical crystal. The visible light source outputs narrow band visible light to the optical crystal. In the optical crystal, the narrow band visible light and the second infrared light having infrared absorption spectrum information of the sample are coupled into sum-frequency light having a visible sum-frequency image. The visible light imaging lens projects the visible sum-frequency image on a predetermined position. The visible light image capturing device is disposed on the position to receive the visible sum-frequency image.

Preferably, the infrared object lens is an infrared infinity-corrected reflective object lens.

Preferably, the optical crystal is a nonlinear optical crystal.

Preferably, the optical crystal is a quasi-phase matching crystal.

Preferably, a dichroic film is formed on one side of the optical crystal. The narrow band visible light is reflected by the dichroic film and the parallel infrared light passes through the dichroic film, Preferably, the microscopic image apparatus further comprises a dichroic mirror. The narrow band visible light is reflected to the object lens by the dichroic mirror and the sum-frequency light passes through the dichroic mirror.

Preferably, the microscopic image apparatus further comprises a optical filter protecting the narrow band visible light from receiving by the visible light image capturing device.

Preferably, the visible light source is a laser source, a light emitting diode or a laser diode.

Preferably, the visible light image capturing device is a CCD device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
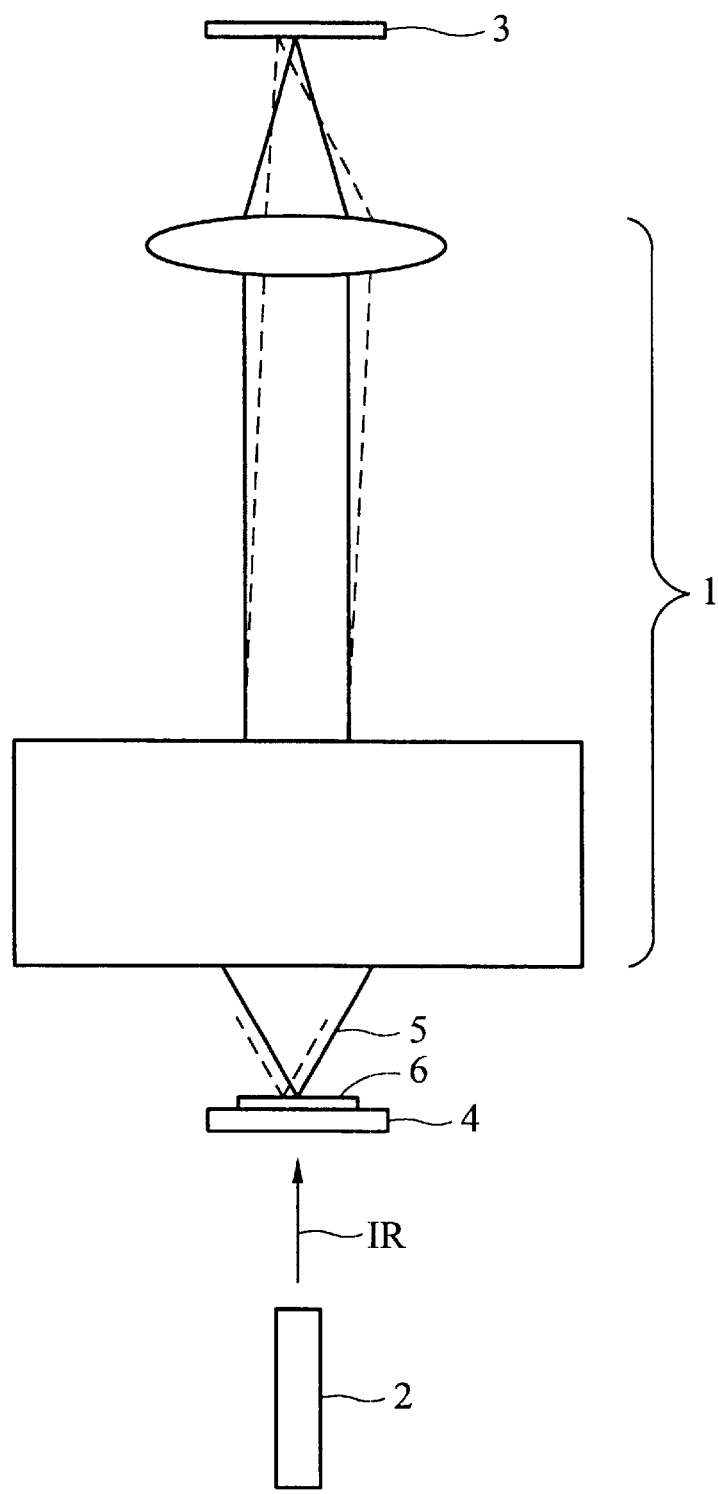
FIG. 1 is a schematic view showing a conventional infrared microscopic image apparatus.
Figure 2:
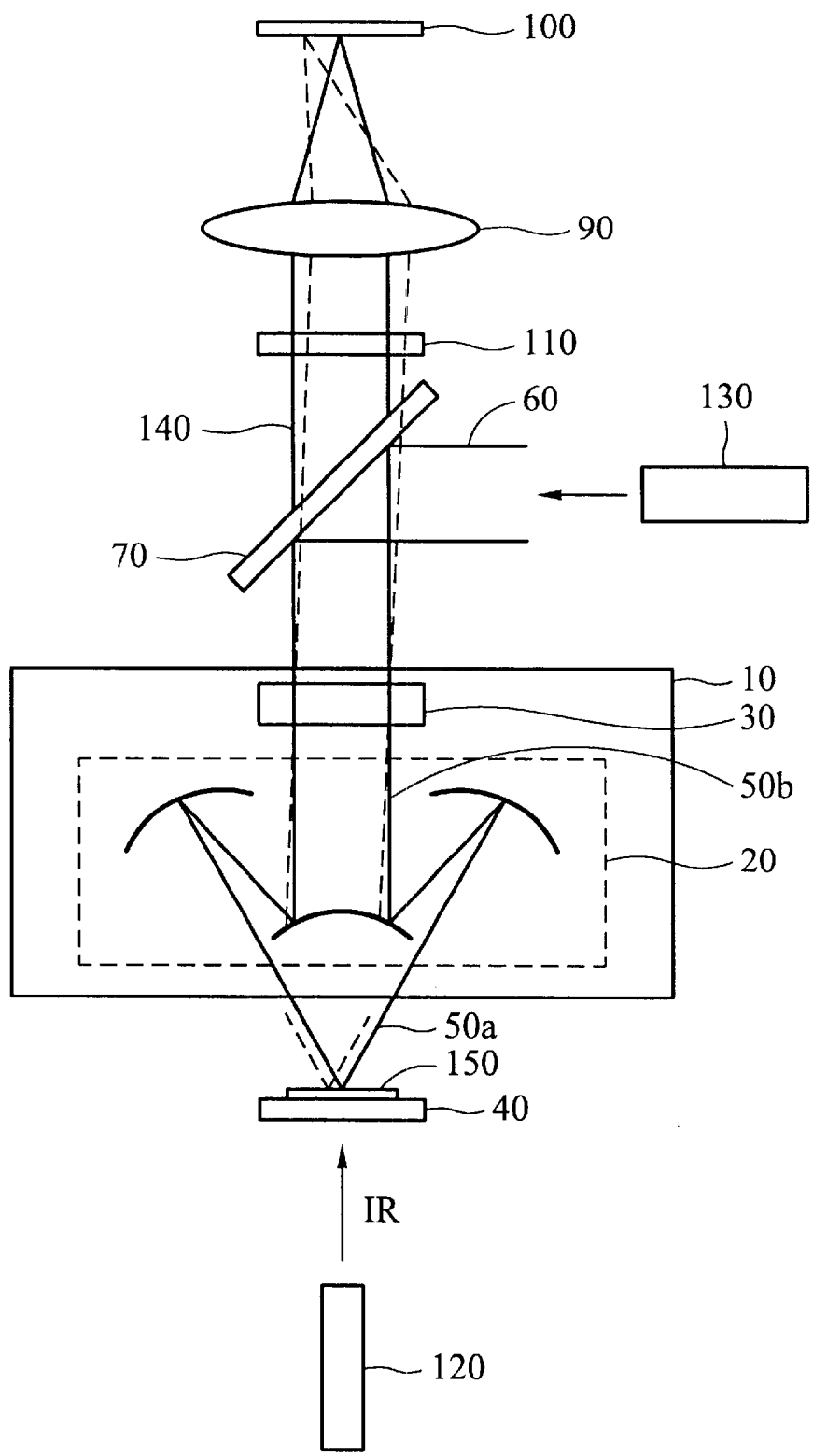
FIG. 2 is a schematic view showing the present microscopic image apparatus for converting infrared light into visible light.

Referring to FIG. 2, the present microscopic image apparatus for converting infrared light into visible light comprises an infrared source 120, a visible light source 130, an object lens 10, a dichroic mirror 70, a visible light imaging lens 90, a visible light image capturing device 100 and a sample stage 40. The object lens 10 for converting infrared light into visible light includes an optical crystal 30 and an infrared object lens 20.

As shown in FIG. 2, a sample 150 is placed on the sample stage 40 and receives infrared light (IR) output from the infrared source 120. After the infrared light (IR) is absorbed by the sample 150, the sample 150 outputs infrared light 50a having infrared absorption spectrum information of the sample 150. The infrared absorption spectrum is vibration spectrum showing the feature of the molecular functional group or chemical bonding of the sample 150.

As shown in FIG. 2, the infrared light 50a enters the infrared object lens 20. The infrared object lens 20 is an infrared infinity-corrected reflective object lens. Namely, the infrared light 50a is reflected by the infrared infinity-corrected reflective object lens 20 to create infinity-corrected parallel infrared light 50b.

As shown FIG. 2, the visible light source 130, such as a laser source, outputs narrow band visible light 60. Then, the narrow band visible light 60 is reflected to the object lens 10 by the dichroic mirror 70.

In the object lens 10, the infinity-corrected parallel infrared light 50b enters the optical crystal 30, such as a nonlinear optical crystal or a quasi-phase matched crystal. In addition, the narrow band visible light 60 also enters the optical crystal 30.

Figure 3:
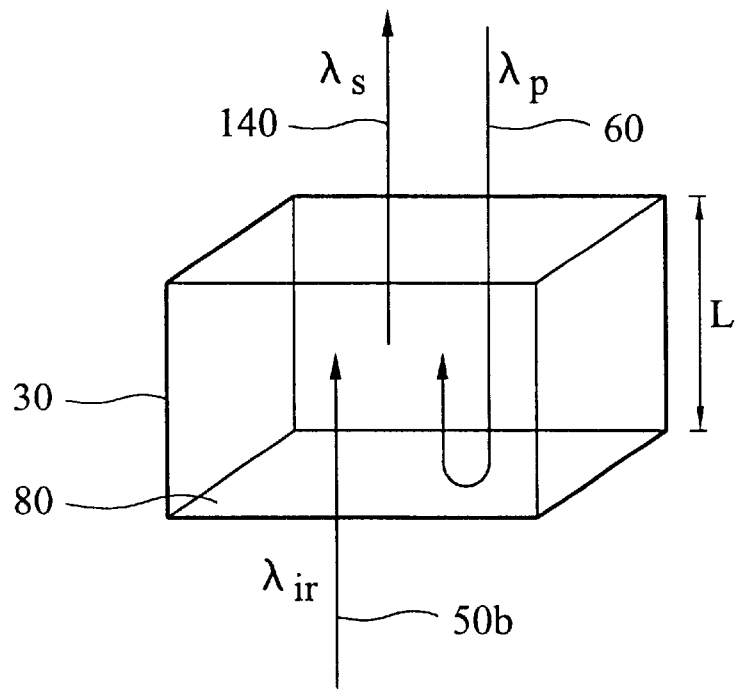
FIG. 3 is a schematic view showing the moving directions of light with different wavelengths in the sum-frequency process.

Referring to FIG. 3, a dichroic film 80 is formed on one side of the optical crystal 30. The infinity-corrected parallel infrared light 50b penetrates the dichroic film 80 and the narrow band visible light 60 is reflected by the dichroic film 80.

As shown in FIG. 3, in the optical crystal 30, the infinity-corrected parallel infrared light 50b and the narrow band visible light 60 are coupled into sum-frequency light 140 when the requirements of phase-matching are satisfied. The requirements of phase-matching include two equations as follows:

$$1/\lambda_{ir} + 1/\lambda_p = 1/\lambda_s \tag{1},$$

$$K_{ir} + K_p = K_s \tag{2},$$

wherein $\lambda_{ir}$ is the wavelength of the infinity-corrected parallel infrared light 50b, $\lambda_p$ is the wavelength of the narrow band visible light 60, $\lambda_s$ is the wavelength of the sum-frequency light 140, $K_{ir}$ is the momentum of the infinity-corrected parallel infrared light 50b, $K_p$ is the momentum of the narrow band visible light 60, and $K_s$ is the momentum of the sum-frequency light 140.

Furthermore, equation (2) can be rewritten as follows:

$$n_o(\lambda_{ir})/\lambda_{ir} + n_o(\lambda_p)/\lambda_p = n_e(\lambda_s, \theta, T, V)/\lambda_s \tag{3},$$

wherein $n_o$ is ordinary-ray refractive index, and $n_e$ is extraordinary-ray refractive index.

In equation (1), the total energy of the infinity-corrected parallel infrared light 50b and the narrow band visible light 60 is equal to the energy of the sum-frequency light 140. In equation (2), the total momentum of the infinity-corrected parallel infrared light 50b and the narrow band visible light 60 is equal to the momentum of the sum-frequency light 140. In equation (3), $n_e$ depends on the angle ($\theta$) of the optical crystal 30, the temperature (T) and voltage (V).

As shown in FIG. 2, the sum-frequency light 140 passes through the dichroic mirror 70 and an optical filter 110. The optical filter 110 blocks the narrow band visible light 60. Then, the sum-frequency light 140 is received by the visible light imaging lens 90 and the visible light image capturing device 100, such as a CCD device.

Referring to FIG. 2, the deviated infrared light (shown by dotted line) also enters the object lens 10.

Figure 4:
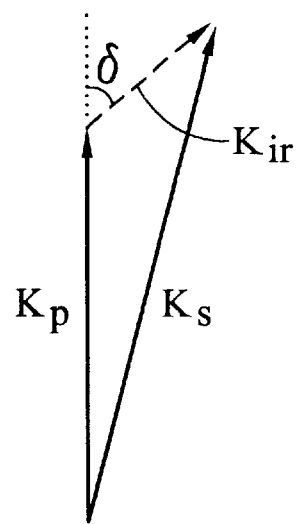
FIG. 4 is a schematic view showing momentum conservation among deviated infrared light, visible light and sum-frequency light in the optical crystal.

Referring to FIG. 4, since the wavelength $\lambda_{ir}$ is significantly greater than the wavelength $\lambda_p$ ($K_{ir}$ is significantly smaller than $K_p$), the momentum of the sum-frequency light 140 and the infinity-corrected parallel infrared light 50b is substantially parallel to that of the narrow band visible light 60. As shown in FIG. 4, the phase-dismatching $\Delta\Phi$ among the infinity-corrected parallel infrared light, the narrow band visible light and the sum-frequency light in the optical crystal 30 is expressed as follows:

$$\Delta\Phi = \Delta K \times L = K_s - K_{ir} - K_p \times L \tag{4},$$

wherein L is the length of the optical crystal.

Sum-frequency light 140 is created when $\Delta\Phi$ is smaller than $2\pi$. Thus, the expanding angle $\delta$ has a limit. The expanding angle $\delta$ determines the field of view of the infrared image of the sample 150.

Figure 5:
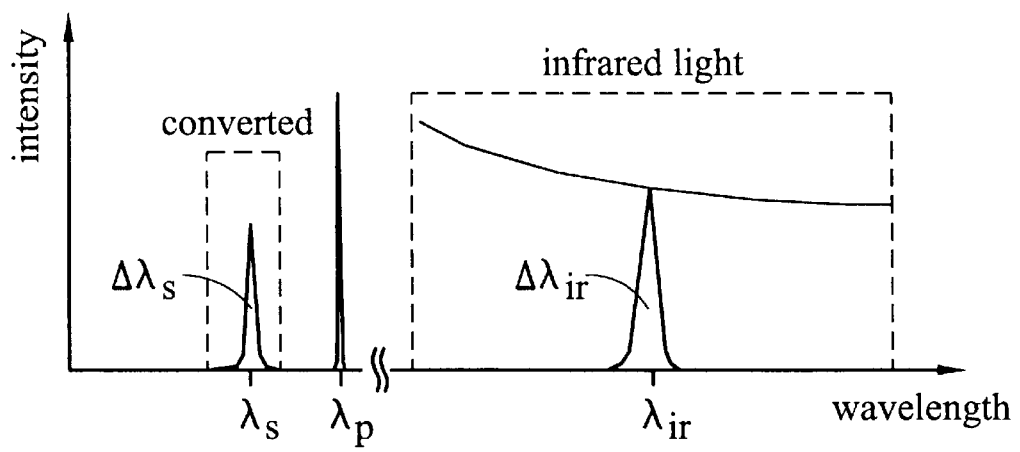
FIG. 5 is a schematic view showing the wavelength range (dotted line) of convertible infrared light, the wavelength range (dotted line) of sum-frequency light, the band width (continuous line) of convertible infrared light at an angle of the optical crystal and the band width (continuous line)of sum-frequency light.

Referring to FIG. 5 the wavelength $\lambda_p$ of the narrow band visible light 60 is a constant. When the optical crystal 30 is at the angle $\theta$, the visible light image capturing device 100 can detect the wavelength $\lambda_s$ of the visible sum-frequency light 140.

Figure 6:
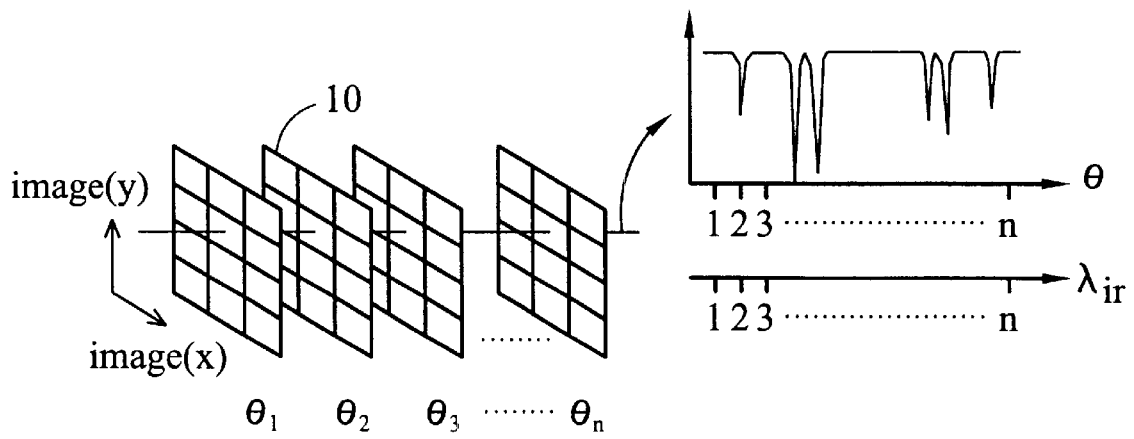
FIG. 6 is a schematic view showing the sum-frequency images (x, y) obtained by the visible light image capturing device and the infrared absorption spectrum shown on the position at different angles of the optical crystal.

Referring to FIG. 6, when the optical crystal 30 is at different angles, the visible light image capturing device 100 can detect the images of the visible sum-frequency light 140 with different wavelength $\lambda_s$. Each $\lambda_s$ image is corresponding to the $\lambda_{ir}$ image of the infinity-corrected parallel infrared light 50b before conversion. Then, the corresponding infrared absorption spectrum of each pixel can be obtained from the images. After passing through the sample 150, the infrared light is converted into visible light in the optical crystal 30. Because the distance that the infrared light passes through the atmosphere is very short, the amount of the infrared light absorbed by the atmosphere is little. Thus, it is unnecessary to supply dry air into the infrared microscopic image apparatus.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microscopic image apparatus for converting infrared light into visible light, comprising:

a sample stage for accommodating a sample;

an infrared source outputting first infrared light to the sample, the first infrared light penetrating the sample to create second infrared light having infrared absorption spectrum information of the sample;

an object lens for converting infrared light into visible light having an optical crystal and an infrared object lens, wherein the infrared object lens receives the second infrared light having infrared absorption spectrum information of the sample and converts the second infrared light into parallel infrared light to enter the optical crystal;

a visible light source outputting narrow band visible light to the optical crystal, wherein, in the optical crystal, the narrow band visible light and the second infrared light having infrared absorption spectrum information of the sample are coupled into sum-frequency light having a visible sum-frequency image;

a visible light imaging lens projecting the visible sum-frequency image on a predetermined position; and a visible light image capturing device disposed on the position to receive the visible sum-frequency image.

2. The microscopic image apparatus for converting infrared light into visible light as claimed in claim 1, wherein the infrared object lens is an infrared infinity-corrected reflective object lens.

3. The microscopic image apparatus for converting infrared light into visible light as claimed in claim 1, wherein the optical crystal is a nonlinear optical crystal.

4. The microscopic image apparatus for converting infrared light into visible light as claimed in claim 1, wherein the optical crystal is a quasi-phase matched crystal.

5. The microscopic image apparatus for converting infrared light into visible light as claimed in claim 1, wherein a dichroic film is formed on one side of the optical crystal, the narrow band visible light reflected by the dichroic film, and the parallel infrared light penetrating the dichroic film.

6. The microscopic image apparatus for converting infrared light into visible light as claimed in claim 1, further comprising a dichroic mirror, the narrow band visible light reflected to the object lens by the dichroic mirror, and the sum-frequency light passing through the dichroic mirror.

7. The microscopic image apparatus for converting infrared light into visible light as claimed in claim 1, further comprising an optical filter protecting the narrow band visible light from receiving by the visible light image capturing device.

8. The microscopic image apparatus for converting infrared light into visible light as claimed in claim 1, wherein the visible light source is a laser source.

9. The microscopic image apparatus for converting infrared light into visible light as claimed in claim 1, wherein the visible light source is a light emitting diode.

10. The microscopic image apparatus for converting infrared light into visible light as claimed in claim 1, wherein the visible light source is a laser diode.

11. The microscopic image apparatus for converting infrared light into visible light as claimed in claim 1, wherein the visible light image capturing device is a CCD device.

\* \* \* \* \*